United States Patent [19]

Oster et al.

[11] Patent Number: 5,203,750
[45] Date of Patent: Apr. 20, 1993

[54] ANGLED VEHICLE AXLE ASSEMBLY

[75] Inventors: Terry L. Oster; Kraig J. Schlosser, both of Auburn, Ind.

[73] Assignee: Dana Corporation, Toledo, Ohio

[21] Appl. No.: 779,385

[22] Filed: Oct. 18, 1991

[51] Int. Cl.5 .................................................. F16H 1/38
[52] U.S. Cl. ..................................... 475/230; 475/220; 74/417
[58] Field of Search .............. 475/198, 200, 201, 220, 475/230, 246, 207, 222, 223; 74/417

[56] References Cited

U.S. PATENT DOCUMENTS

| | | | |
|---|---|---|---|
| 1,609,264 | 11/1926 | Melanowski | 475/230 |
| 1,858,773 | 5/1932 | Gurney | 475/222 X |
| 1,886,823 | 11/1932 | Manville | 180/70 |
| 1,993,912 | 3/1935 | Austin | 180/70 |
| 2,037,464 | 4/1936 | Flogaus | 180/70 |
| 2,120,594 | 6/1938 | Alden | 475/230 X |
| 2,126,876 | 8/1938 | Doman | 475/200 |
| 2,195,479 | 4/1940 | Buchner | 475/200 |
| 2,459,705 | 1/1949 | Julien | 475/198 X |
| 2,569,341 | 9/1951 | Schgolin | 475/198 |
| 2,651,216 | 9/1953 | Alden | 475/230 X |
| 2,693,244 | 11/1954 | Rockwell et al. | 180/22 |
| 2,750,806 | 6/1956 | Hobbs | 74/417 |
| 3,256,746 | 6/1966 | Smith | 74/417 |
| 3,262,512 | 7/1966 | O'Brien | 475/222 X |
| 3,937,093 | 3/1976 | Johnson et al. | 74/417 |
| 4,362,221 | 12/1982 | Manning | 180/73 |
| 4,402,238 | 9/1983 | Craig | 475/230 |
| 4,468,981 | 9/1984 | Ries | 475/220 X |
| 4,781,079 | 11/1988 | Takahashi | 475/230 X |
| 4,829,849 | 5/1989 | Masuda et al. | 475/220 X |
| 4,856,373 | 8/1989 | Washizawa | 475/230 X |
| 5,041,069 | 8/1991 | Horst | 475/230 X |
| 5,098,355 | 3/1992 | Long | 475/220 |

FOREIGN PATENT DOCUMENTS

| | | | |
|---|---|---|---|
| 452715 | 11/1948 | Canada | 475/230 |
| 58-137642 | 8/1983 | Japan | 475/230 |

Primary Examiner—Rodney H. Bonck
Assistant Examiner—Ryan W. Massey
Attorney, Agent, or Firm—Frank B. McDonald; Robert M. Leonardi; Barbara John Haushalter

[57] ABSTRACT

A vehicle axle assembly includes a pair of output shafts having a first rotational axis, an input shaft having a second rotational axis oriented at an angle which is not perpendicular to the first rotational axis of the pair of output shafts, and an intermediate shaft having a third rotational axis oriented at an angle which is perpendicular to the first rotational axis of the pair of output shafts. The input shaft includes a first gear of a first gear set disposed between a pair of tapered roller bearings. A pinion nut attached thereto exerts a clamp force, which is prevented from affecting a preloading force on the tapered roller bearings by a shoulder formed on the input shaft. The intermediate shaft includes a second gear of the first gear set, wherein the first gear set forms an angled connection between the input shaft and the intermediate shaft for achieving a first reduction. The intermediate shaft further includes a first gear of a second gear set which interacts with a second gear of the second gear set to achieve a second reduction.

16 Claims, 2 Drawing Sheets

ANGLED VEHICLE AXLE ASSEMBLY

Background of the Invention

The present invention relates to automotive vehicles and, more particularly, to vehicle axle assemblies.

The satisfactory operation of many vehicles, particularly heavy vehicles, requires a large vehicle driving mechanism which necessarily occupies a considerable amount of space. In the matter of passenger transporters, such as buses, this limits suspension configuration, passenger room, and vehicle dynamics. The space restraints of the vehicle require that the transmission be moved closer to the axle. However, since most vehicles use conventional axles, it is becoming extremely difficult to have the transmission and axle any closer together.

One option for solving this problem is to shorten the drive shaft. However, due to physical limitations in the current state of the art in drive shafts, the drive shaft cannot be shortened excessively. Also, a shorter drive shaft would reduce suspension travel, adversely affecting vehicle ride.

Another option is to put the drive shaft at an angle, so the length of the drive shaft can remain the same, but the distance between the transmission and the axle can be shortened. Unfortunately, very few manufacturers have the capability to cut large gears with an oblique shaft angle. Also, it is very expensive to develop a new gear set, as compared to using an existing, commercially available gear set.

It is seen, then, that there exists a need for a compact vehicle axle assembly having increased flexibility in pinion angle and position that can be used in many types of vehicles.

Summary of the Invention

This need is met by the vehicle axle assembly of the present invention which uses a double reduction technique to reduce the speed of associated gear ratios. The double reduction technique facilitates use of an oblique pinion angle which enables compact installation and increased flexibility in the pinion angle and position.

In accordance with one aspect of the present invention, a vehicle axle assembly comprises a pair of output shafts having a first rotational axis, an input shaft having a second rotational axis oriented at an oblique angle to said first rotational axis of said pair of output shafts, and an intermediate shaft having a third rotational axis oriented at an angle which is perpendicular to said first rotational axis of said pair of output shafts.

In accordance with another aspect of the invention, a vehicle axle assembly comprises an input shaft having a shoulder located at a first bearing of a first pair of tapered roller bearings on the input shaft for preventing a clamp force exerted by a pinion nut from affecting a preset preloading force on the first pair of tapered roller bearings.

In accordance with a third aspect of the invention, a vehicle axle assembly comprises a pair of output shafts, an input shaft having at least one tapered roller bearing, an intermediate shaft having at least one tapered roller bearing, and a unitary bearing cage for supporting the at least one tapered roller bearing of both the input shaft and the intermediate shaft.

In accordance with a fourth aspect of the invention, a vehicle axle assembly comprises an input shaft having a tapered roller bearing and a unitary bearing cage for supporting the tapered roller bearing, wherein the unitary bearing cage is secured to an interior of an axle housing.

Objects and advantages of the invention will be apparent from the following description, the accompanying drawings and the appended claims.

Detailed Description of the Invention

Figure 1:
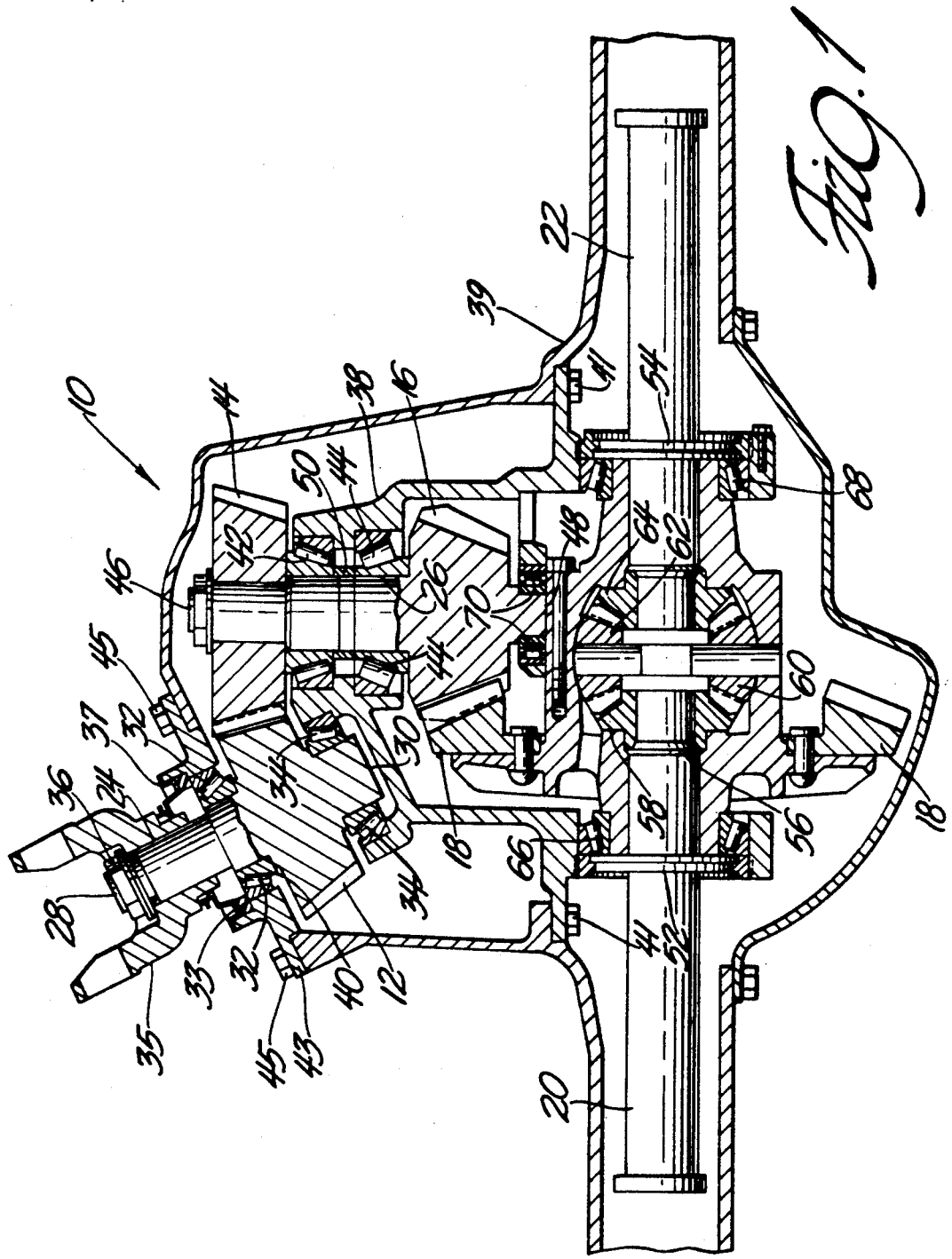
FIG. 1 is a cut away view of a vehicle axle assembly of the invention.

Referring to the drawings, in FIG. 1 there is illustrated a vehicle axle assembly 10 having a primary gear set including beveled gears 12 and 14 interacting with a secondary gear set including hypoid gears 16 and 18 to achieve a double reduction. In FIG. 1, beveled gear 12 drives beveled gear 14 to achieve a first reduction, and hypoid gear 16 drives hypoid gear 18 to achieve a second reduction. Since the second gear 14 of the first gear set and the first gear 16 of the second gear set are rigidly connected on the same shaft 26, gears 14 and 16 are driving at the same speed. Hence, the double reduction incrementally reduces the speed of the gear ratios of all of the gears 12, 14, 16, and 18. Typically, a first reduction gear ratio is approximately 1:1.12 between gears 12 and 14, and approximately 1:3.54 between gears 16 and 18, resulting in a total ratio of approximately 1:3.96 between gears 12 and 18. However, the overall gear ratio can be adjusted according to the vehicle requirements, with a typical overall range being between 2.9 all the way up to nine.

The present invention requires specialty components only for the first reduction, utilizing existing components for the second reduction. The first reduction is achieved with beveled gears 12 and 14, which are smaller, easier to manufacture, and less expensive than specialty hypoid gears manufactured at oblique angles. Using a small first reduction allows the use of smaller primary gears 12 and 14 for the angled gear set. The second reduction using existing larger gears, then, produces the final desired gear ratio that cannot be achieved with a single reduction technique, unless the single reduction employs large gears, which are much more expensive and difficult to manufacture at oblique angles. Additionally, the angle and location of the smaller primary gear set is much more flexible with a double reduction design than with a single reduction design using a larger gear set.

Figure 2:
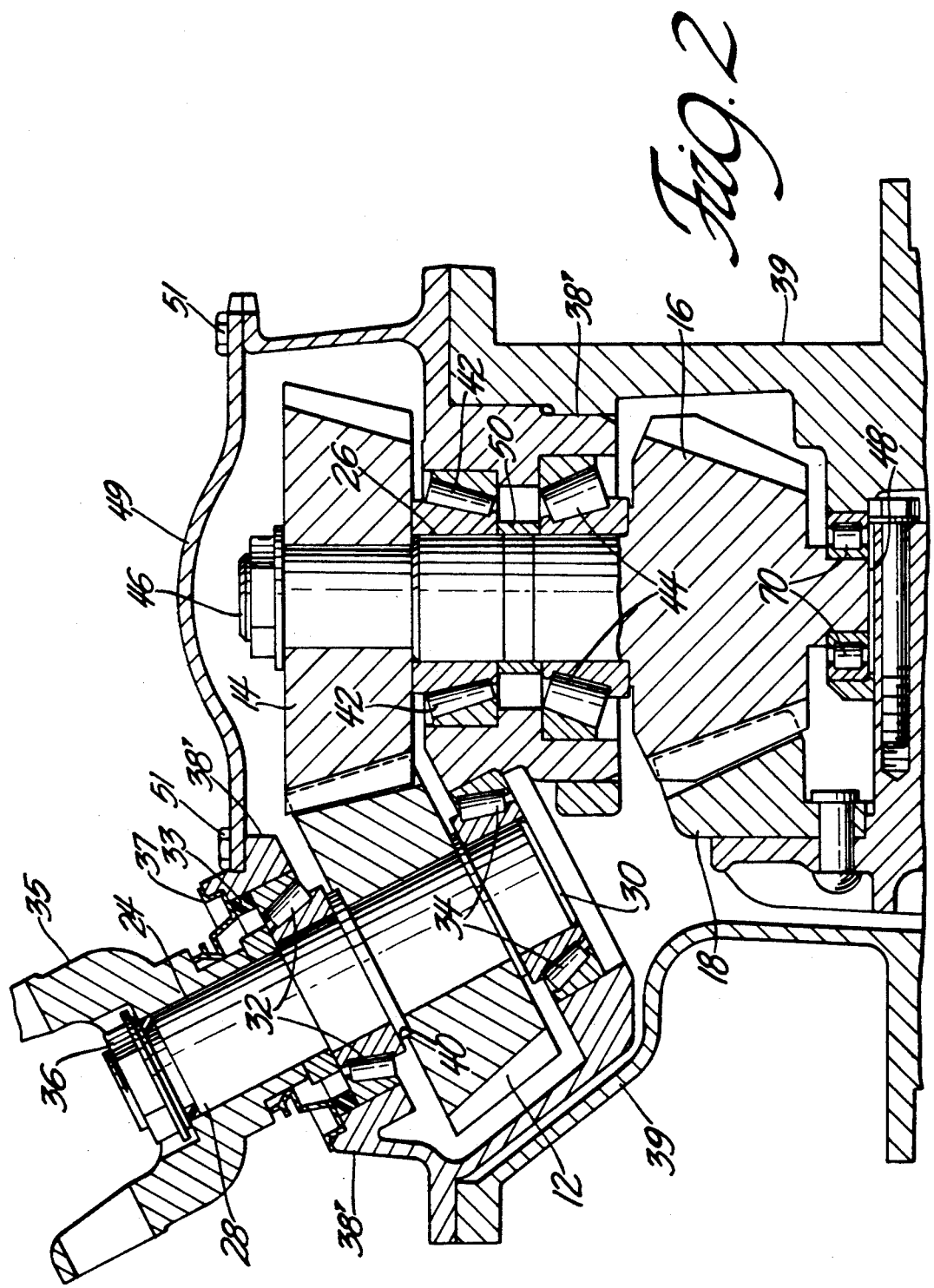
FIG. 2 a cut away of an alternative vehicle axle assembly.

Continuing with FIG. 1, the vehicle axle assembly 10 includes a pair of output shafts 20 and 22 having a first rotational axis, an input shaft or input pinion 24 having a second rotational axis oriented at an oblique angle to the first rotational axis of the pair of output shafts 20 and 22, and an intermediate shaft 26 having a third rotational axis oriented at an angle which is perpendicular to the first rotational axis of the pair of output shafts 20 and 22. In FIGS. 1 and 2, the angle between the input shaft 24 and the intermediate shaft 26 is approximately twenty-seven degrees. Consequently, in FIG. 1, the angle between the output shaft 20 and the input shaft 24 is approximately sixty-three degrees. The angle between the input shaft 24 and the intermediate shaft 26 can be adjusted according to the requirements of the particular vehicle in which the vehicle axle assembly 10 is being installed, although that angle is typically between zero degrees and ninety degrees.

In a preferred embodiment of the present invention, the input shaft 24 has a first end 28 and a second end 30, with the first gear 12 of the first gear set situated between the two ends 28 and 30. The first gear 12 is also disposed between a pair of tapered roller bearings 32 and 34. A preload adjusting ring 33 presets a preloading force on the bearings 32 and 34. Preferably, the preload adjusting ring 33 is threaded on an outer side of a housing 39, wherein male threads thread into a bearing cage 38, in FIG. 1, or 38' in FIG. 2. Threading the preload adjusting ring 33 on the housing 39 allows adjustments in the preload to be made. The preload adjusting ring 33 should be removable so the vehicle axle assembly 10 can be installed relatively easily in the housing 39. Once the vehicle axle assembly 10 is installed in the housing 39, a seal assembly 37 is situated around the preload adjusting ring 33 to provide a seal. The seal assembly 37 is any standard seal assembly already commercially available.

After the preloading force is set, a yoke 35 is splined onto the first end 28 for rotation therewith. A pinion nut 36 is attached to the first end 28 of the input shaft 24 for retaining the yoke 35 and for exerting a clamp force. A shoulder 40 is located at the bearing 32 to prevent the clamp force exerted by the pinion nut 36 from affecting the preloading force on the tapered roller bearings 32 and 34. The shoulder 40 of the input shaft 24 isolates the pinion preload from the clamp force exerted by the pinion nut 36, preventing the clamp force from being transmitted between the bearing 32 and the bearing 34. This allows improved control of the bearing 32 preload.

In FIGS. 1 and 2, the intermediate shaft 26 has a first end 46, a second end 48, and a spacer 50 situated therebetween and disposed between a second pair of tapered roller bearings 42 and 44. The spacer 50 controls the distance between the bearings 42 and 44. A larger spacer 50 would result in a lower preload, since less force would then be transmitted between bearings 42 and 44, while a smaller spacer would result in a higher preload. The first end 46 of the intermediate shaft 26 is splined to the second gear 14 of the first gear set. The second end 48 forms the first gear 16 of the second gear set.

The vehicle axle assembly 10 may be mounted to the axle housing 39 by any of a variety of methods. For example, in FIG. 1, the first and second gear sets may be enclosed in the housing 39 by installing the bearing cage 38 internally to the axle housing 39 with any suitable means including bolts 41. In FIG. 1, the bearing 32 is mounted in a separate bearing cage 43, so the bearing cage 43 is secured to the housing 39 with additional means, such as bolts 45. Since the bolts 41 are internal to the housing 39 in FIG. 1, leakage and seal breakage at that joint are eliminated, since there is no longer an external seam there. As a result, the consequences of counter torques caused during vehicle operation have a negligible effect on the axle seal integrity.

Alternatively, as illustrated in FIG. 2, all of the tapered roller bearings 32, 34, 42, and 44 can be mounted in the single, unitary bearing cage 38' and the unitary bearing cage 38' can then be secured to the axle housing 39. Since the bearing cage 38' is unitary, the axle housing 39 may include a separate cover means 49, securable directly to the unitary bearing cage 38' by any suitable means including bolts 51. With the cover means 49, then, the first and second gear sets in FIG. 2 are completely enclosed.

Referring back to FIG. 1, a differential nest 56 is comprised of four spur gears 58, 60, 62, and 64. Adjusting rings 52 and 54, attached to the differential nest 56 by differential bearings 66 and 68, serve a dual purpose. First, the adjusting rings 52 and 54 position the second gear 18 of the second gear set. Once the gear 18 is properly positioned, the adjusting rings 52 and 54 can be tightened to provide a preload to differential bearings 66 and 68. The gear 18 is then driven by the gear 16, which is supported by a nose bearing 70, situated between the differential nest 56 and the intermediate shaft 26.

Employing the double reduction technique of the present invention, with the first reduction occurring at the angled gear set, provides enough flexibility to meet a large variety of fitting requirements without the expense of having to design and install different gear sets for each different gear ratio requirement. Consequently, the position and angle of the primary gear set comprised of gears 12 and 14 can be varied with relative ease, generating more possible gear ratios with fewer new gear sets.

The present invention provides for a vehicle axle assembly which uses a double reduction technique wherein existing gear ratios, which are already commercially available, are used in conjunction with variable input gear ratios. The first reduction is achieved at an angled connection between the input shaft and the intermediate shaft, where the gear ratios can be varied. The second reduction is achieved by a larger gear set between the intermediate shaft and the output shafts.

Having described the invention in detail and by reference to the preferred embodiment thereof, it will be apparent that other modifications and variations are possible without departing from the scope of the invention defined in the appended claims.

What is claimed is:

1. A vehicle axle assembly comprising:
   a pair of output shafts having a first rotational axis;
   an input shaft having a second rotational axis oriented at an oblique first angle of approximately twenty-seven degrees to said first rotational axis of said pair of output shafts; and
   an intermediate shaft having a third rotational axis oriented at a second angle of approximately sixty-three degrees to one of said pair of output shafts which is perpendicular to said first rotational axis of said pair of output shafts.

2. A vehicle axle assembly as claimed in claim 1 further comprising a first gear set for achieving a first reduction.

3. A vehicle axle assembly as claimed in claim 2 wherein said first gear set comprises a first gear and a second gear, said first gear attached to said input shaft and said second gear attached to said intermediate shaft.

4. A vehicle axle assembly as claimed in claim 3 wherein said first gear and said second gear are beveled gears.

5. A vehicle axle assembly as claimed in claim 2 further comprising a second gear set for achieving a second reduction.

6. A vehicle axle assembly as claimed in claim 5 wherein said second gear set comprises a first gear and a second gear, said first gear attached to said intermediate shaft and said second gear interacting with said first gear.

7. A vehicle axle assembly as claimed in claim 6 wherein said first gear and said second gear are beveled gears.

8. A vehicle axle assembly comprising:
an input shaft having a shoulder, a first bearing of a first pair of tapered roller bearings on said input shaft abutting said shoulder, said shoulder for preventing a clamp force exerted by a pinion nut from affecting a preset preloading force on said first pair of tapered roller bearings ; and
an axle housing containing said input shaft, a preload adjusting ring for presetting said preloading force attached to said axle housing and abutting an outer race of said first bearing.

9. A vehicle axle assembly as claimed in claim 8 further comprising:
a pair of output shafts; and
an intermediate shaft having a second pair of tapered roller bearings, and further having a spacer situated between a first bearing and a second bearing of said second pair of tapered roller bearings, said spacer for controlling a distance between said first bearing and said second bearing.

10. A vehicle axle assembly as claimed in claim 8 wherein said input shaft further has a yoke splined onto a first end of said input shaft for rotation therewith, said yoke being splined onto said input shaft after presetting said preloading force.

11. A vehicle axle assembly as claimed in claim 10 wherein said shoulder prevents said preset preloading force from being affected when said yoke is splined to said first end of said input shaft.

12. A vehicle axle assembly comprising:
a pair of output shafts;
an input shaft having at least one tapered roller bearing;
an intermediate shaft having at least one tapered roller bearing;
a unitary bearing cage for supporting said at least one tapered roller bearing of said input shaft and said at least one tapered roller bearing of said intermediate shaft; and
an axle housing, said unitary bearing cage secured to an interior of said axle housing.

13. A vehicle axle assembly as claimed in claim 12 wherein said intermediate shaft has a first tapered roller bearing and a second tapered roller bearing.

14. A vehicle axle assembly as claimed in claim 13 wherein said unitary bearing cage supports said at least one tapered roller bearing of said input shaft and said first and second tapered roller bearings of said intermediate shaft.

15. A vehicle axle assembly as claimed in claim 13 wherein said input shaft has a first tapered roller bearing and a second tapered roller bearing.

16. A vehicle axle assembly as claimed in claim 15 wherein said unitary bearing cage supports said first and second tapered roller bearings of said input shaft and said first and second tapered roller bearings of said intermediate shaft.

* * * * *